United States Patent [19]

Clitheros et al.

[11] Patent Number: 4,564,410
[45] Date of Patent: Jan. 14, 1986

[54] ADHESIVE APPLICATION APPARATUS

[75] Inventors: Derek P. Clitheros, Newport Pagnell; David A. Livingstone; David B. Roberts, both of Luton; Roland Cawthorne, Harpenden, all of England

[73] Assignee: General Motors Corporation, Detroit, Mich.

[21] Appl. No.: 625,454

[22] Filed: Jun. 28, 1984

[30] Foreign Application Priority Data

Jul. 2, 1983 [GB] United Kingdom ................ 8318038

[51] Int. Cl.⁴ ............................................. B05C 16/00
[52] U.S. Cl. ................................... 156/356; 118/697; 156/357; 156/578; 318/570
[58] Field of Search ............... 156/350, 351, 356, 578; 118/696–698, 320, 321, 409; 365/478, 479; 318/568, 570

[56] References Cited

U.S. PATENT DOCUMENTS

| 3,785,898 | 1/1974 | Gerber et al. | 156/356 X |
| 4,357,900 | 11/1982 | Buschor | 118/697 X |
| 4,409,650 | 10/1983 | Noguchi | 318/568 X |
| 4,458,628 | 7/1984 | Fujii | 118/697 |

FOREIGN PATENT DOCUMENTS

| 1318083 | 5/1973 | United Kingdom . |
| 1355410 | 6/1974 | United Kingdom . |
| 1512879 | 6/1978 | United Kingdom . |
| 2019260 | 10/1979 | United Kingdom . |
| 2016960 | 10/1979 | United Kingdom . |
| 1595759 | 8/1981 | United Kingdom . |
| 2108011 | 5/1983 | United Kingdom . |

Primary Examiner—David Simmons
Attorney, Agent, or Firm—Charles E. Leahy

[57] ABSTRACT

An adhesive application apparatus for automatically applying a strip of adhesive material of predefined shape accurately to the periphery of either the window opening in a motor vehicle or a pane of glass sized to cover that window opening, the apparatus comprising a pressurized supply means feeding adhesive material under pressure to a nozzle 16 of a dispensing means 14, said nozzle being carried upon a rigid framework 52 in such a fashion that the nozzle can be moved in any direction relative to the surface on which the strip of adhesive material is to be placed by means of DC servo drive motors 44, 74 and 84, and the tip of the nozzle can be accurately guided around said periphery by a nozzle angle adjustment means operated by a DC servo drive motor 92, the rate at which the adhesive material is supplied to the nozzle 16 and the rates of operation of all four of the DC servo motors 44, 74, 84 and 92 all being under the full control of a computer numerical control system.

6 Claims, 8 Drawing Figures

ADHESIVE APPLICATION APPARATUS

This invention relates to adhesive application apparatus for applying a continuous strip of extrudable adhesive material to a solid surface. In particular, it relates to an adhesive application apparatus for applying a continuous strip of extrudable adhesive material to the periphery of either a window opening in a motor vehicle or a pane of glass sized to cover said window opening.

In the production of motor vehicles by mass production techniques, it has been common in the past to secure fixed window glass in a motor vehicle by means of various sealing strips which embrace both the edges of the window glass and the edges of the window opening in the motor vehicle to produce a firm waterproof seal between the window glass and the motor vehicle body. The techniques used for fixing window glass in position in motor vehicles in this fashion tend to be time-consuming and labour-intensive operations. Consequently, recently there have been developments in the mass production of motor vehicles which involve securing fixed window glass into position into window openings in motor vehicle bodies by means of adhesive material made from curable synthetic elastomeric polymers, which adhesive material, in its uncured state, is a viscous sticky material capable of being extruded under pressure in the form of a long continuous strip. Such a material, in its uncured state, shows good adherence to both glass and metal, and, on curing, forms a tough resilient tenacious bond between the glass and the material of the motor vehicle body. Such a bond is both long lasting and waterproof, but, for appearances sake, it is common also to add a finishing edging strip to the fixed glass to cover the area of the bonded joint visible on inspection of the motor vehicle.

A technique at present in use upon the production line of some motor vehicles is that of feeding a supply of the uncured adhesive material to the nozzle of a manually controlled applicator gun carried on a movable carriage slung above a specified station in the production line. As each motor vehicle reaches that station in the production line, an operator manually applies a continuous bead of the adhesive material to a peripheral channel surrounding a window opening in the motor vehicle, and then removes any surplus adhesive material from the channel so that the channel is completely full with the adhesive. A second operator then places a corresponding pane of glass into position over the window opening so that the peripheral edges of the glass overlap the filled channel surrounding the window opening, and then presses the pane of glass firmly into position. Any excess adhesive material which is forced from the joint as a result of pressing the pane of glass into position is quickly wiped away before the adhesive has chance to cure. Curing of the adhesive material normally takes place within a matter of minutes after the glass has been pressed into position. Such a method of operation produces an effective seal between the pane of glass and the periphery of the window opening in the motor vehicle body, but it is labour-intensive, and can be subject to error, particularly with regard to the quantity of adhesive material used. It is difficult, if not impossible, to effectively utilise any excess adhesive material that is removed after application of the continuous bead of adhesive material to the channel, so this excess adhesive material must necessarily be discarded. Consequently, there is a need to provide a means of applying this very expensive adhesive material as economically and as efficiently as possible to save expense upon the material as to prevent potential damage to the motor vehicle body surface surrounding the window openings as result of any inadequate removal of any excess adhesive material from these surfaces.

An adhesive application apparatus according to the present invention, for applying a continuous strip of extrudable adhesive material to the periphery of either a window opening in a motor vehicle or a pane of glass sized to cover said window opening, comprises a pressurised supply means connected to a source of said adhesive material, a dispensing means including a nozzle movably mounted within a rigid framework alignable with said periphery, said dispensing means being in fluid connection with said pressurised supply means and being movable relative to said rigid framework by drive means, and a computer numerical control system connected to both the pressurised supply means and said drive means, said computer numerical control system being operable by a predetermined programme to exert full automatic control over the pressurised supply means and the drive means so that, when the apparatus is in operation, a predefined quantity of said strip of adhesive material is extruded at a predefined rate and the nozzle of the dispensing means is caused to accurately follow said periphery.

Preferably, an adhesive application apparatus according to the present invention is one in which said drive means includes three separate drive motors for controlling the movement of said dispensing means relative to said rigid framework in three linear dimensions all mutually at right angles to one another, each drive motor controlling said movement in one linear dimension, and a fourth drive motor controlling angular movement of said nozzle around each corner of said window opening or said pane of glass, all four of said drive motors being under full positional and speed control exerted by said computer numerical control system.

Advantageously, the nozzle of the dispensing means of the adhesive application apparatus according to the present invention is shaped so as to produce a predefined cross-sectional shape in the strip of extruded adhesive material.

As a preferred feature of the present invention, the pressurised supply means includes a reservoir which contains at least sufficient of said extrudable adhesive material for applying around the entire periphery of said window opening or pane of glass, which reservoir is emptied at said predefined rate during application of said adhesive material to said periphery and is automatically refilled with adhesive material when said application of adhesive material from the dispensing means is not occurring.

One preferred embodiment of the present invention is an adhesive application apparatus for applying a continuous strip of extrudable adhesive material to the periphery of a window opening in a motor vehicle, in which the rigid framework is movably mounted within a support structure in such a manner that the rigid framework can be quickly aligned with said periphery and clamped into position on said motor vehicle prior to the commencement of extrusion of said strip of adhesive material from said nozzle, and the apparatus includes sensor means connected to said computer numerical control system and operable to prevent extrusion of the adhesive material until the rigid framework is both aligned with said periphery and clamped into position on said motor vehicle.

An alternative preferred embodiment of the present invention, for applying a continuous strip of extrudable adhesive material to the periphery of a pane of glass sized to cover a window opening in a motor vehicle, is one in which the rigid framework is mounted within a support frame which includes at least one support carriage for said pane of glass, which support carriage is movably mounted on said support frame so that said pane of glass can be rapidly and accurately aligned relative to said rigid framework prior to commencement of the extrusion of said strip of adhesive material from said nozzle, and the support carriage includes sensor means linked to said computer numerical control system and operable to prevent extrusion of adhesive material until said pane of glass is rapidly and accurately aligned with said rigid framework.

The invention and how it may be performed are hereinafter particularly described with reference to the accompanying drawings, in which.

Figure 1:
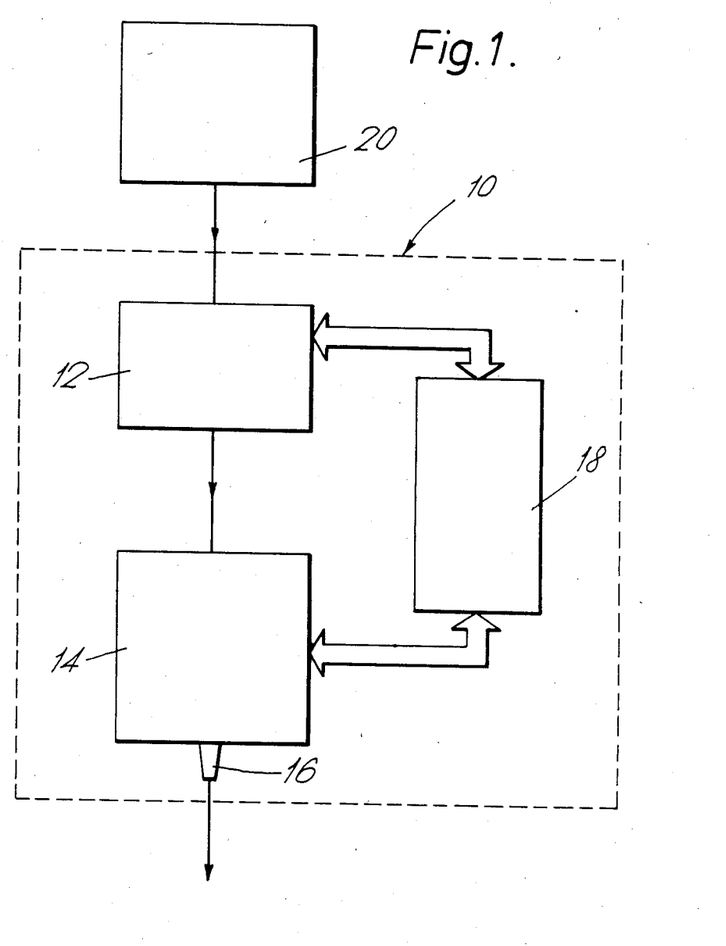
FIG. 1 is a schematic layout of an adhesive application apparatus according to the present invention.

A schematic layout for an adhesive application apparatus according to the present invention is shown in FIG. 1 of the drawings, in which the basic components of the adhesive application apparatus 10 are enclosed within the dotted line, these components comprising a pressurised supply means 12, a dispensing means 14 including a nozzle 16 and a computer numerical control system 18. As can be seen in FIG. 1, a source of said adhesive material 20 is in fluid connection with the pressurised supply means 12, and the pressurised supply means 12 is in fluid connection with the dispensing means 14, so that, during operation of the apparatus 10, a continuous strip of adhesive material can be extruded from the nozzle 16 of the dispensing means 14. As will be described in more detail hereinafter in the specification, the dispensing means 14 is movably mounted within a rigid framework, and is movable relative to said rigid framework by drive means. The computer numerical control system 18 is directly linked to the pressurised supply means 12 and to the dispensing means 14 by means of an address bus which connects sensor means in both the pressurised supply means 12 and the dispensing means 14 to input/output devices located within the computer numerical control system 18. Computer numerical control system 18 is a commercially available unit of the type utilised for controlling the operation of machine tools by computer numerical control. Such control systems customarily include a programmable microprocessor-based controller, memory devices, a timer and one or more input/output devices. The basic operation of such computer numerical control systems is well known to those skilled in the art, and it will be appreciated that the system can be made up of any of a number of known commercially available devices in order to achieve the control desired. One such computer numerical control system that is suitable for use in the apparatus according to the present invention is a computer numerical control system produced by Adolf Numerical Controls of Loughton, Essex, England. The computer numerical control system 18 carries within its memory devices a number of predetermined programmes, each of which programmes relates to a specific peripheral shape of a window opening in a motor vehicle or pane of glass sized to cover that window opening. One of these programmes is chosen prior to operation of the apparatus, either by an operator of the apparatus or automatically by means of sensors associated with the dispensing means 14, and the computer numerical control system 18 exerts full automatic control over the pressurised supply means 12 and the drive means of the dispensing means 14 in accordance with the preselected programme throughout the operation of the apparatus to apply the continuous strip of extrudable adhesive material to the periphery of either a window opening in a motor vehicle or a pane of glass sized to cover said window opening. The computer numerical control system 18 thus ensures that, when the apparatus is in operation, a predefined quantity of said strip of adhesive material is extruded at a predefined rate from the nozzle 16 of the dispensing means 14, and the nozzle 16 of the dispensing means 14 is caused to accurately follow the periphery of either the window opening in the motor vehicle or the pane of glass sized to cover said window opening.

Figure 2:
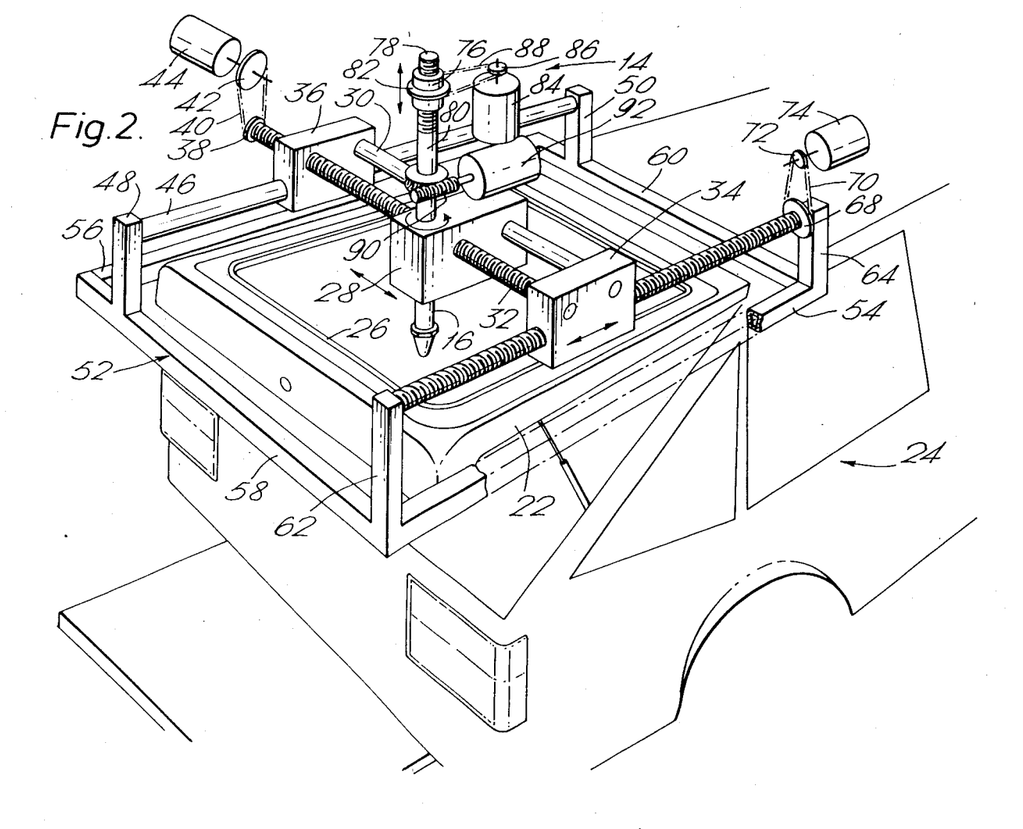
FIG. 2 is a schematic isometric drawing of an adhesive application apparatus according to one embodiment of the present invention, showing the apparatus in use upon a motor vehicle.

Turning now to FIG. 2 of the accompanying drawings, this shows a schematic isometric view of the dispensing means 14 of the present invention mounted in position upon a tail-gate 22 of a hatchback motor vehicle 24, ready to apply a strip of adhesive material within a peripheral channel 26 extending around the periphery of a window opening in the tail-gate 22. As can be seen in FIG. 2, the dispensing means 14 has the nozzle 16 thereof rotationally mounted in a support block 28, which support block is movably supported upon two guide rails 30 and 32, the ends of the guide rail 30 being secured within respective side support blocks 34 and 36. Guide rail 32 is screw-threaded throughout its length, and passes through a similarly screw-threaded aperture in the support block 28, and has one end thereof rotationally anchored within side support block 34. The other end of the screw-threaded rail 32 passes through an aperture in the side support block 36, and terminates in a pulley 38. Pulley 38 is linked by means of a drive belt 40 and drive pulley 42 to the driving shaft of a drive motor 44. Rotation of the drive shaft of the drive motor 44 in either direction will produce a corresponding rotation of the screw-threaded guide rail 32, and this rotation of the screw-threaded guide rail 32 within the screw-threaded aperture in support block 28 will cause support block 28 to move either towards or away from side support block 36. The rate at which this linear movement of support block 28 towards or away from side support block 36 occurs will depend upon the rate of revolution of the shaft of drive motor 44.

Side support block 36 is slidably mounted on a guide rail 46 which extends through an aperture in the side support block 36 which is at right angles to the aperture through which the screw-threaded guide rail 32 passes. The ends of the guide rail 46 are secured in respective side posts 48 and 50 of a rigid framework 52, which rigid framework constitutes the rigid framework referred to in the description in respect of FIG. 1 of the drawings. Rigid framework 52 includes longitudinally extending side rails 54 and 56, and laterally extending side rails 58 and 60. Side posts 48 and 50 extend respectively at right angles from side rails 58 and 60, and similar side posts 62 and 64 also extend respectively at right angles from side rails 58 and 60. Side support block 34 is movably supported upon a screw-threaded guide rail 66 which extends between the side posts 62 and 64 parallel to the guide rail 46, one end of the screw-threaded guide rail 66 being rotationally anchored in the side post 62. The screw-threaded guide rail 66 passes through a similarly screw-threaded aperture in the side support block 34. The other end of the screw-threaded guide rail 66 is rotatably secured within the side post 64, and there is a pulley 68 secured to the screw-threaded guide rail 66 adjacent side post 64. Pulley 68 is connected to the driving shaft of a second drive motor 74 through a drive belt 70 and a drive pulley 72. Rotation of the driving shaft of the second drive motor 74 in either direction will result in corresponding rotation of the screw-threaded guide rail 66, and, by reason of the threaded engagement between the side support block 34 and the screw-threaded guide rail 66, side support block 34 can be made to move towards or away from pulley 68. Since side support block 34 is rigidly connected to side support block 36 by means of the guide rail 30, this movement of the side support block 34 along the longitudinal axis of screw-threaded guide rail 66 will result in the nozzle 16 of the dispensing means 14 being caused to move in a linear dimension that is at right angles to the linear dimension that it moves in as a result of the movement of the support block 28 on screw-threaded guide rail 32. In the subsequent description hereinafter in the specification, movement of the nozzle 16 in a direction parallel to the longitudinal axis of the screw-threaded guide rail 32 will be termed "movement along the X axis", and movement of the nozzle 16 in a direction parallel to the longitudinal axis of the screw-threaded guide rail 66 will be termed as "movement in the Y axis". It will be appreciated that the drive motors 44 and 74 can be used in conjunction with one another to cause the nozzle 16 to traverse any pattern of movement at any predefined rate of movement in a plane that lies parallel to the plane defined by the rigid framework side rails 54, 56, 58 and 60. Such an apparatus would be entirely suitable for applying a strip of adhesive material around a predefined periphery of a surface residing in that plane, but it would not be capable of dealing with the curved panels of glass that are commonly used in motor vehicles today.

Consequently, the apparatus according to the present invention includes an adjustment means for producing accurate movement of the nozzle 16 in a third linear dimension mutually at right angles to the previously mentioned linear dimensions, that is linear movement of the nozzle 16 upwards or downwards relative to support block 28 as shown in FIG. 2. This arrangement is only shown schematically in FIG. 2, and the mechanism for achieving this movement will be described in more detail later in the description in respect of FIGS. 6 and 7 of the accompanying drawings. Nevertheless, the basic concept of this movement is disclosed in FIG. 2 and will thus be described. Nozzle 16 is rotationally mounted in support block 28 so that it can also be moved upwards or downwards relative to the support block 28 by means of a threaded nut attachment 76 mounted upon a threaded portion 78 of a feed pipe 80 to the nozzle 16. Nut attachment 76 is rotationally mounted, in a manner not shown in FIG. 2, so that the nut attachment 76 cannot itself move up or down. It can be rotated in its mounting by means of a pulley 82 driven by a third drive motor 84 through a drive pulley 86 and drive belt 88. Rotation of the pulley 82 in either direction will cause the threaded portion 78 of the feed pipe 80 to move up or down relative to the support block 28. This movement of the nozzle 16 will hereinafter be termed "movement in the Z axis".

Preferably the apparatus according to the present invention is one having the nozzle 16 of the dispensing means 14 shaped to produce a predefined cross-sectional shape in the strip of extruded adhesive material. By arranging for the strip of extruded adhesive material to have said predefined shape, it is possible to ensure more accurate control of the quantity of adhesive used and to markedly reduce, if not eliminate, the possibility of any excess adhesive material being displaced from the periphery of either the window opening or the pane of glass when the pane of glass is placed in position over the window opening of the motor vehicle. If such a predefined shape of strip of adhesive material is being produced by the nozzle 16, then it is necessary to ensure that nozzle 16 also guides the strip around the corners of either the window opening or the corresponding pane of glass. This is done in the apparatus shown in FIG. 2 by arranging for a portion of the feed pipe 80 to be freely rotatable relative to the threaded portion 78 so that the nozzle 16 can be turned through a predetermined angle as the nozzle 16 approaches a corner of the channel 26 in the tail-gate 22. The mechanism required to produce this turning movement of the nozzle 16 is indicated only schematically in FIG. 2, and comprises a worm and worm wheel assembly 90 which is driven by a fourth drive motor 92. The rotation of the drive shaft of the fourth drive motor 92 results in angular movement of the nozzle 16 so as to guide the strip of extruded adhesive material around the corners of the channel 26 in the tail-gate 22.

The drive motors 44, 74, 84 and 92 are all D.C. servo motors, linked to the computer numerical control system 18 via suitable encoding devices (not shown). The rigid framework 52 is movably mounted within a support structure (not shown) situated above the production line and in alignment with the production line, such that motor vehicles on the production line can be indexed into position beneath the support structure. When dealing with hatch-back motor vehicles such as vehicle 24, the vehicle is indexed into position by the movement of the production line, the tail-gate 22 of the vehicle 24 is raised into a substantially horizontal position, and the rigid framework 52 is lowered into place over the tail-gate 22 and clamped into place upon the body of the vehicle. The apparatus includes sensor means (not shown) connected to the computer numerical control system 18, which sensor means are operable to prevent the computer numerical control system from executing the predetermined programme for the tail-gate 22 until the rigid framework 52 is both correctly aligned relative to the tail-gate 22 and securely clamped in position on the motor vehicle 24. Once these conditions are met, the computer numerical control system 18 commences to operate the apparatus according to the predetermined programme, commencing the extrusion of the strip of adhesive material when the nozzle 16 is at the mid point of one of the sides of the peripheral channel 26. Once extrusion commences, the nozzle 16 is moved smoothly and accurately around the peripheral channel 26 by the computer numerical control system 18 controlling the speeds and directions of rotation of all four of the drive motors 44, 74, 84 and 92. When the nozzle 16 has completed its journey around the peripheral channel 26 and returned to its starting point, the computer numerical control system 18 shuts off the supply of adhesive material, and signals to an operator that the application of the adhesive material is complete. The operator then unclamps the rigid framework 52 to allow it to be moved clear of the vehicle 24, the tail-gate 22 is lowered into its closed position on the vehicle 24, and the correctly shaped pane of glass is pressed into position over the window opening in the tail-gate 22. The support structure carrying the rigid framework 52 is then positioned over the next car on the production line, and the procedure repeated. The use of the apparatus of the present invention for applying a strip of adhesive material directly to the periphery of a window opening in a motor vehicle is best suited for operation on production lines where all of the vehicles on which the apparatus is used have the same window opening.

Figure 3:
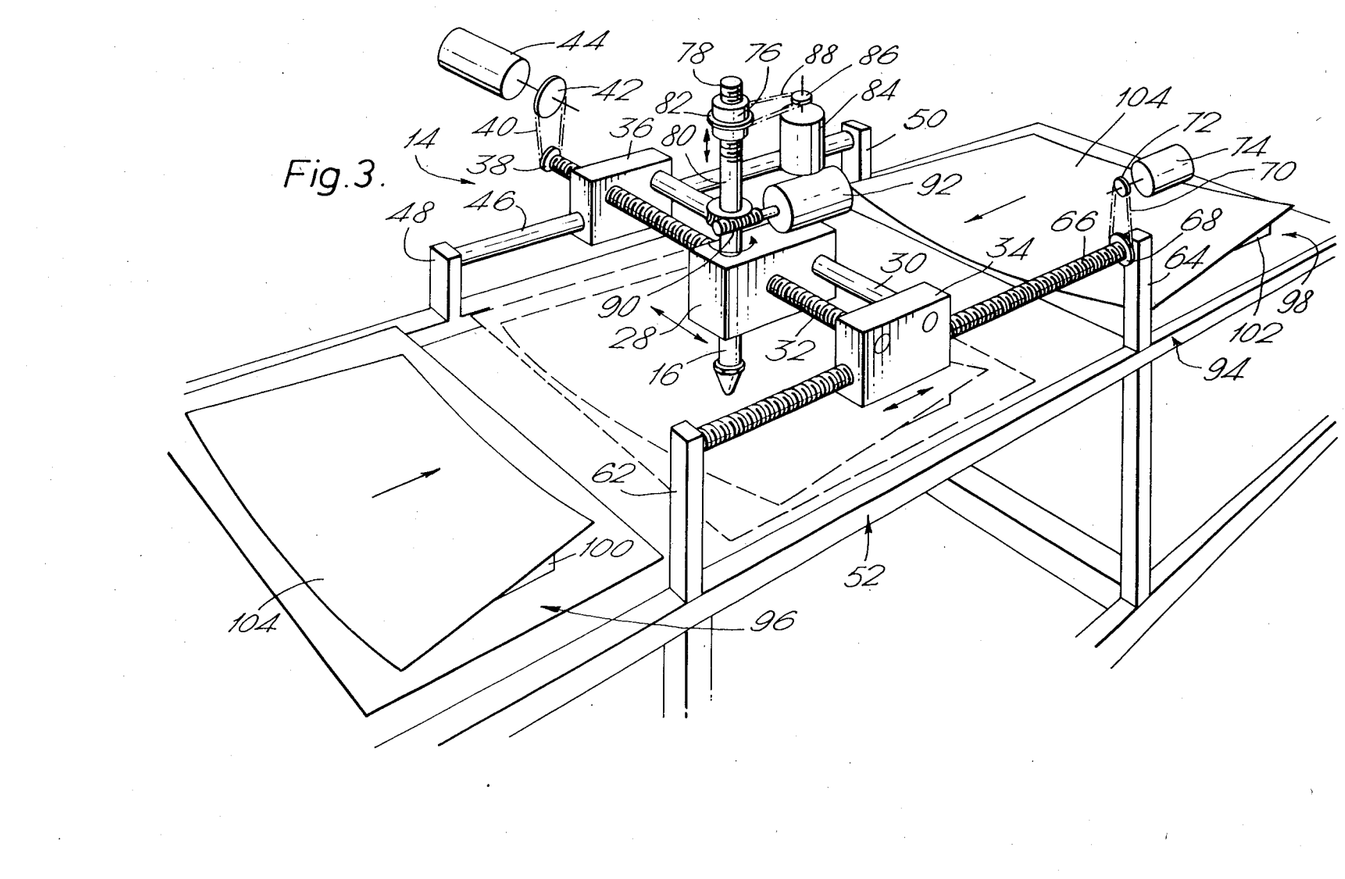
FIG. 3 shows an isometric view of a second, preferred embodiment of the present invention, showing the apparatus in use for applying adhesive material to the periphery of panes of window glass.

A more versatile, preferred embodiment of the present invention is illustrated in FIG. 3 of the drawings, where the application apparatus is used to apply the strip of adhesive material to the peripheral edge of the pane of glass to be mounted in the motor vehicle. FIG. 3 again shows the dispensing means 14 of the apparatus according to the present invention in a schematic form, very similar to that shown in FIG. 2 of the drawings. Consequently, similar parts of the apparatus have been labelled with the same reference numbers as used in FIG. 2 of the drawings. Thus it can be seen that the nozzle 16 again is governed in its movement by the four drive motors 44, 74, 84 and 92, but that the rigid framework 52 has been incorporated into an overall support structure 94 which underlies the dispensing means 14. Movably mounted upon this support structure 94 are two support carriages 96, 98, one situated to the left hand side of the dispensing means 14 and the other being situated on the right hand side of the dispensing means 14. Each of these support carriages is movably carried within the support structure 94 in such a fashion that the support carriage can be rapidly and accurately shuttled into position beneath the dispensing means 14 from its original left hand or right hand position. Thus, for example, support carriage 96 can be rapidly and accurately shuttled into a central position underneath the dispensing means 14 from its normal loading position on the left hand side of dispensing means 14, and, when in position under the dispensing means 14, the support carriage 96 can be locked into position in the support structure 94 relative to the rigid framework 52. Each of the support carriages 96, 98 is equipped with a removable glass-carrying fixture 100, 102, each glass-carrying fixture being shaped so as to accurately hold a pane of glass 104 of predefined shape aligned relative to the rigid framework 52. The panes of glass 104 shown schematically in FIG. 3 are curved back lights for motor cars. Sensor means (not shown) are provided within the support carriages 96, 98, which are linked to the computer numerical control system 18 and are operable to prevent any extrusion of adhesive material from the nozzle 16 until the carriage is in place beneath the dispensing means 14 and is releasably locked into the rigid framework 52. Similarly, each glass-carrying fixture 100, 102 includes sensor means (not shown), each of which sensor means is linked to the computer numerical control system 18 and is operable to detect the presence of a pane of glass 104 in said glass-carrying fixture and to prevent extrusion of adhesive material until said pane of glass 104 is present in the glass-carrying fixture.

The adhesive application apparatus shown in FIG. 3 can be readily rendered more versatile by the incorporation of one or more extra sensors in each of the glass-carrying fixtures 100, 102, which sensors are linked to the computer numerical control system 18 and are utilised to indicate to the computer numerical control system 18 which particular shape of glass is being carried by the glass-carrying fixture. With such an arrangement, the computer numerical control system carries within its memory a number of programmes, each one of which relates to a specific shape of glass pane to be dealt with. When an operator places a specific shape of glass pane upon the glass-carrying fixture 100 or 102, the sensors in the glass-carrying fixture send logic signals to the computer numerical control system 18 to inform the computer numerical control system 18 whether or not there is a glass surface immediately above the sensor. The sensors are all positioned in predetermined positions in the glass-carrying fixtures 100, 102 so that, for each shape of glass pane carried by the glass-carrying fixture, a unique signal is produced by the sensors within that glass-carrying fixture to instruct the computer numerical control system 18 which programme to select for moving the nozzle 16 of the dispensing means 14. Consequently, it will be appreciated that it is therefore possible to rapidly and accurately place a predefined strip of adhesive material on the periphery of a number of differently shaped panes of glass without requiring any involvement of an operator of the application apparatus apart from the necessity for that operator to place the pane of glass concerned correctly within the glass-carrying fixture. Such an adhesive application apparatus according to this preferred embodiment of the present invention is thus highly suited for use on motor vehicle production lines employed in manufacturing a range of motor vehicles utilising differently shaped panes of fixed glass in the motor vehicle body.

Figure 4:
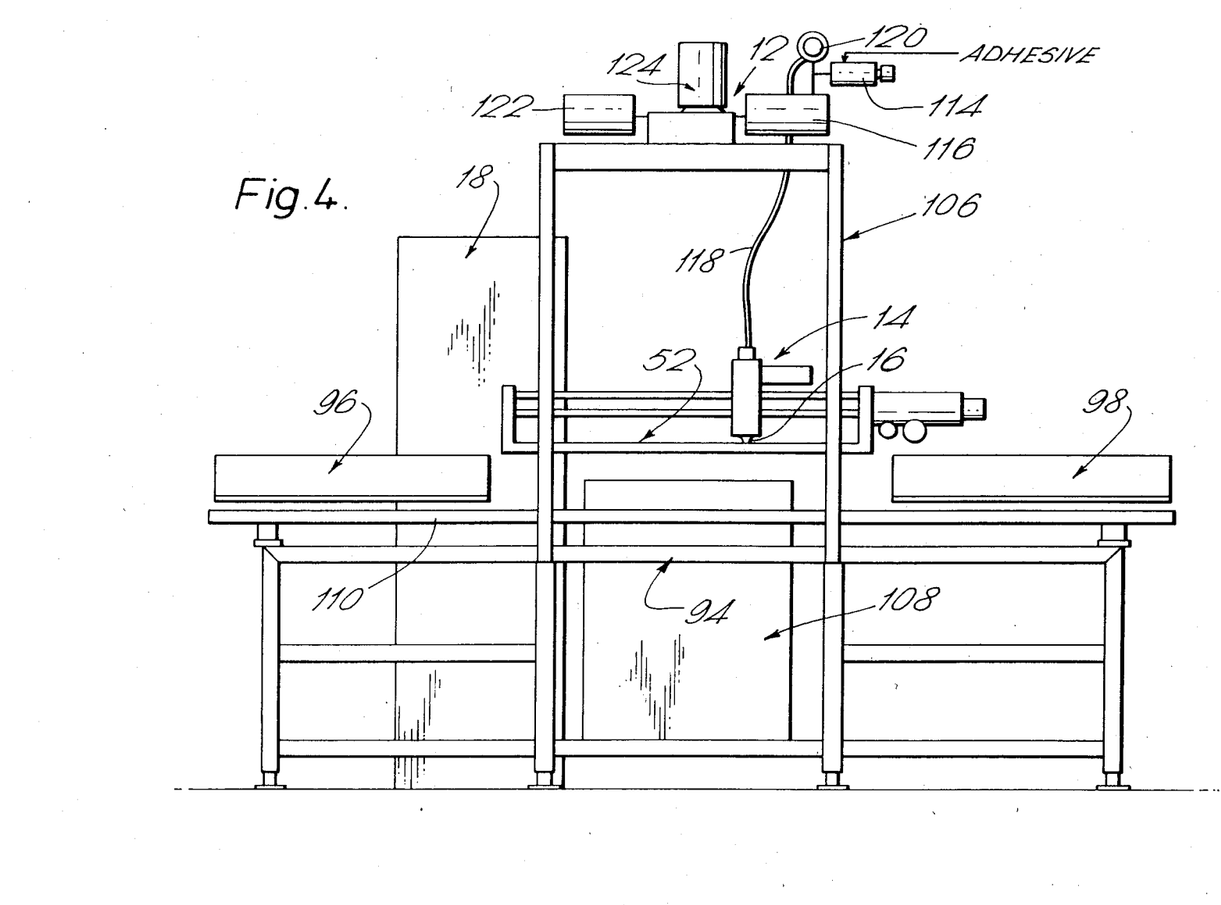
FIG. 4 shows a front elevation of the apparatus shown schematically in FIG. 3.
Figure 5:
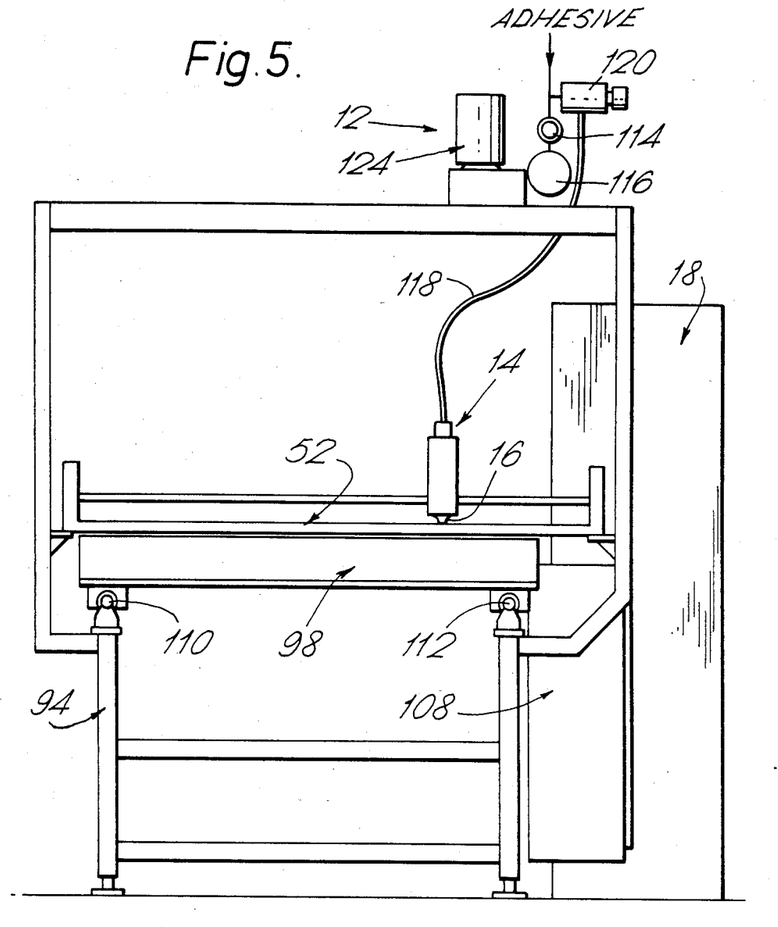
FIG. 5 shows a side elevation of the apparatus shown in FIG. 4.

FIGS. 4 and 5 of the accompanying drawings illustrate the preferred embodiment of the present invention as shown in FIG. 3, and serve to illustrate the relatively compact arrangement of the components of the invention in this preferred embodiment. It must be borne in mind that FIGS. 4 and 5 show a practical layout of the components of the present invention in order to be able to obtain the operating performance illustrated schematically in FIG. 3. Consequently, although the same reference numerals are used in FIGS. 4 and 5 as are used in FIG. 3, in some instances there is not direct correlation between the items shown in FIG. 3 and similar items shown in FIGS. 4 and 5. As can be seen in FIGS. 4 and 5, the support structure 94 includes a tower structure 106 located above the rigid framework 52, which tower structure 106 carries the pressurised supply means 12 for the dispensing means 14. The computer numerical control system 18 is located at the rear of the support structure 94, adjacent the left hand side, as seen in FIG. 4, of the tower structure 106. Alongside the computer numerical control system 18 is located an electrical systems cabinet 108 which incorporates all the electrical circuitry and power supplies required for the electrical operation of the pressurised supply means 12, the dispensing means 14 and the operation of the support carriages 96 and 98. Details of the adhesive circuit to the nozzle 16, the hydraulic circuit employed in the pressurised supply system 12, and the pneumatic circuit utilised in controlling the movement of the support carriages 96 and 98 will be described in more detail in FIG. 8 hereinafter.

The two support carriages 96 and 98 are carried within the support structure 94 on a pair of rodless cylinders 110 and 112, rodless cylinder 110 serving to operate support carriage 96 and rodless cylinder 112 serving to operate support carriage 98. Both of these rodless cylinders are operated by compressed air utilising electrically controlled solenoid valves controlled by the electrical circuitry in electrical supply cabinet 108. Each of the two support carriages 96 and 98 can shuttle between the load positions in which they are shown in FIG. 4, which correspond to the furthest extent of travel of the corresponding rodless cylinder in one direction, and an adhesive application position beneath the dispensing means 14, in which position the respective support carriage is first brought to a halt by stop means (not shown) and then latched into a predetermined aligned position beneath the dispensing means 14 by means of pneumatically controlled releasable latches (not shown). The support carriages 96 and 98 are designed to shuttle alternately beneath the dispensing means 14, on the basis that, whilst one support carriage is in place beneath the dispensing means 14, an operator is unloading adhesive-coated glass from the other support carriage and replacing the adhesive-coated glass with another fresh pane of glass to be coated. The movement of the support carriages 96 and 98 to and fro upon the support structure 94 is under the control of the operator, but the system used can be readily adjusted to place the operation of the two support carriages entirely under the control of the computer numerical control system 18, so leaving the operator free merely to concentrate on loading and unloading the support carriages at their load positions. In such an arrangement, the computer numerical control system 18 would utilise the signals received from the sensor means in the glass-carrying fixtures 100 and 102 to determine when a respective support carriage 96, 98 is loaded ready to shuttle into position beneath the dispensing means 14.

Turning now to the pressurised supply means 12 at the top of the tower structure 106, adhesive material from the source of adhesive material 20 is supplied under pressure to an entry valve 114 of the pressurised supply means 12. The adhesive material used in the apparatus of the present invention is a highly viscous mixture of polyurethane prepolymers sold under the trade name of "Betaseal 71904 HV VP 02508-2" manufactured by Gurit-Essex Inc. of Freienbach, Western Germany. This adhesive material is a moisture-curing, highly viscous, tacky material requiring a working temperature of 20°-60° C., and has a curing period of 15 minutes at the maximum. The adhesive material is supplied to the entry valve 114 at a pump pressure of 5,000 p.s.i. and a temperature of 40° C. Entry valve 114, when opened, supplies the adhesive material to an adhesive load cylinder 116, which load cylinder contains at one filling at least enough adhesive material to apply a strip of the adhesive material around the complete periphery of a pane of glass to be thus treated. A discharge outlet from the load cylinder 116 is connected to a discharge valve 120 which, in turn, is connected to a flexible heated hose 118 leading to the nozzle 16 of the dispensing means 14. Entry valve 114 and discharge valve 120 are connected together in such a fashion pneumatically so that, when entry valve 114 is open, discharge valve 120 is closed, and vice-versa. Both the entry valve 114 and the discharge valve 120 are under the direct control of the computer numerical control system 18. When discharge valve 120 is opened the adhesive material within the load cylinder 116 is forced from that cylinder through the discharge valve 120 and to the flexible heated hose 118 to the nozzle 16 at a predetermined rate by the operation of a hydraulic cylinder 122 linked directly to the load cylinder 116, said hydraulic cylinder 122 being operated by a hydraulic pressure generated within a hydraulic power pack 124. As soon as the computer numerical control system 18 has detected that the nozzle 16 of the dispensing means 14 has completed the coating of the periphery of a pane of glass positioned below the dispensing means, it closes discharge valve 120 and opens the entry valve 114 to refill the load cylinder 116 with the adhesive material, ready for the next cycle of operations.

Figure 6:
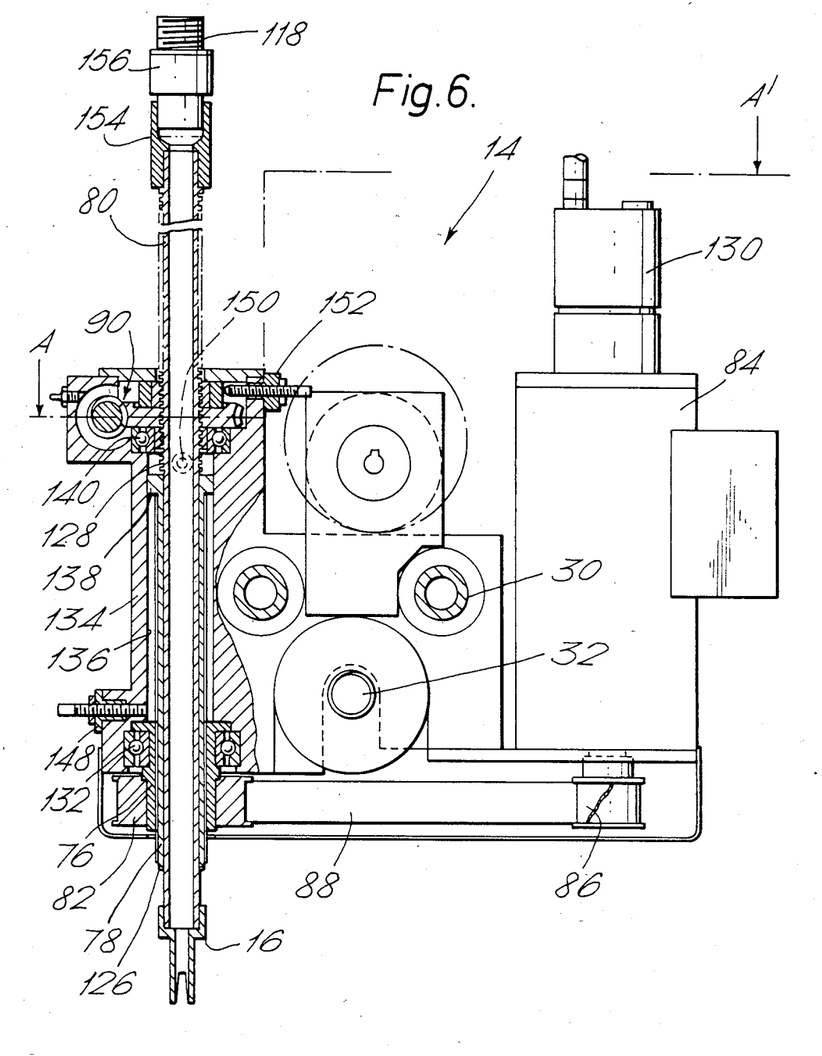
FIG. 6 shows a side view, partly in cross-section, of a dispensing means of the apparatus shown in FIG. 4.
Figure 7:
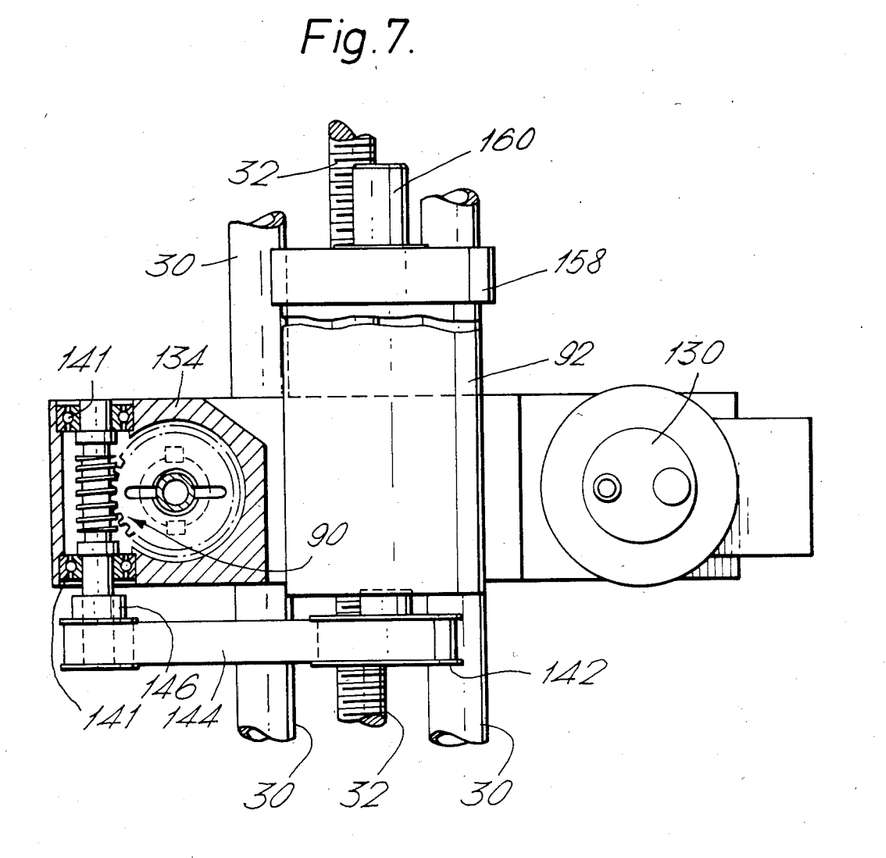
FIG. 7 shows a top, scrap view, partly in cross-section, of a portion of the dispensing means shown in FIG. 6.

The nozzle section of the dispensing means 14 will now be described in more detail with reference to FIGS. 6 and 7, FIG. 7 being a view of FIG. 6 taken on the line A—A'. As can be seen in FIG. 6, the nozzle 16 has a distinctive cross-sectional shape, having a truncated conical-shaped opening across the tip thereof through which the strip of adhesive material is extruded. Such a nozzle shape produces a characteristic, predetermined cross-sectional shape to the strip of adhesive produced, that shape being similar to that of a knobkerrie, the bulbous portion of the knobkerrie-like shape being pressed into contact with the periphery of the pane of glass, and the stem portion of the knobkerrie-like shape being of such a length as to ensure adequate contact of the strip of adhesive material with the bottom of the channel around the window opening of the motor vehicle on to which the pane of glass is to be secured. Nozzle 16 is secured to one end of the feed pipe 80, which is rotatably mounted within the tubular threaded portion 78 by means of a circlip 126 and a bushing 128. The nut attachment 76 is threadably engaged with the threaded portion 78, and is mounted in the pulley 82, which is driven by the DC servo motor 84 through drive pulley 86 and drive belt 88 in order to produce movement of the nozzle 16 in the direction of the "Z" axis. The operation of the DC servo motor 84 is under the full control of the computer numerical control system 18 by means of an encoder 130 positioned on the end of the DC servo motor 84. Nut attachment 76 is rotatably mounted within a roller bearing 132 secured within a housing 134, said housing 134 having a central bore 136 formed therethrough which contains the threaded portion 78 and the feed pipe 80. The threaded portion 78 terminates in an enlarged portion 138 which is a sliding fit within the bore 136, and thus ensures accurate movement of the nozzle 16 in the direction of the "Z" axis.

The bore 136 has an enlarged portion at the top of the housing 134 which houses the worm and worm wheel assembly 90 utilised for causing the nozzle 16 to accurately track the periphery of the pane of glass to be treated. It will be appreciated that, in view of the predetermined shape of strip of adhesive material produced by the nozzle 16, it is essential that this strip of adhesive material should be deposited upon the glass surface so that the stem portion of the knobkerrie-like cross-sectional shape should remain substantially at right angles to the surface of the glass until the treated glass is pressed into position upon its respective window opening. The worm portion of the worm wheel 90 is supported within the enlarged portion of bore 136 by means of roller bearings 141, and there is a roller bearing 140 which carries rotatably mounted therein the worm wheel portion of the worm and worm wheel 90. There is a splined connection between this worm wheel and the bushing 128, which bushing 128 is secured to the feed pipe 80. Consequently, adjustment of the nozzle 16 in the direction of "Z" axis will cause corresponding adjustment of the position of the bushing 128 within the worm wheel, yet the rotation of the worm wheel at any time to cause the nozzle 16 to track the periphery of the pane of glass concerned can still be effected. As can be seen in FIG. 7, the drive to the worm and worm wheel 90 from the DC servo drive motor 92 is achieved via drive pulley 142, drive belt 144 and worm pulley 146. Limit switches 148 and 150 are provided in the bore 136 to limit the degree of adjustment of threaded portion 78 in the direction of the "Z" axis, and there is a limit switch 152 at the top of the housing 134 to prevent the nozzle 16 being rotated more than 360° in either direction. The connection between the feed pipe 80 and the flexible heated hose 118 is by means of a threaded coupling 154 on the end of the feed pipe 80, which threaded coupling is threadly engaged with a rotary joint 156 attached to the end of the flexible headed hose 118. The DC servo motor 92 includes a gear box 158 and a resolver 160, the gear box 158 serving to produce a one to one ratio between the movement of the resolver 160 and the nozzle 16, and the resolver 160 serving to transmit the signals received from the computer numerical control system 18 into angular movement of the nozzle 16.

Figure 8:
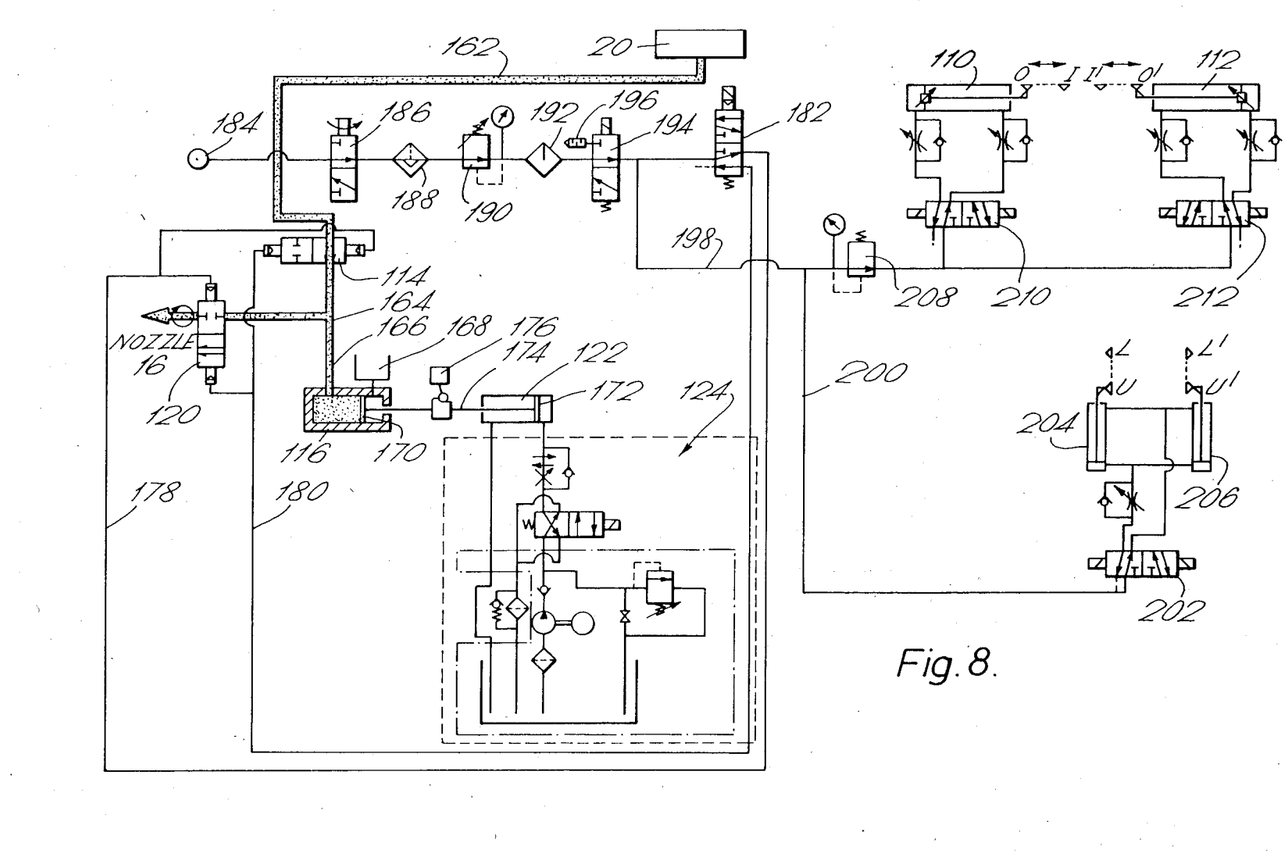
FIG. 8 shows details of the adhesive circuit, hydraulic circuit and pneumatic circuit required for the operation of the apparatus shown in FIGS. 3–5.

Turning now to FIG. 8 of the accompanying drawings, this shows an overall flow sheet for the adhesive applicator of the present invention, and illustrates the flow circuit for the adhesive material, the hydraulic circuit utilised in the pressurised supply means 12, and the pneumatic circuit used to control the operation of valves 114 and 120 in the pressurised supply means and used to control the respective valves required to ensure controlled movement of support carriages 96 and 98 within the support structure 94 of the apparatus shown in FIGS. 4 and 5 of the accompanying drawings. As can be seen in FIG. 8, adhesive material from the source of adhesive material 20 is supplied to entry valve 114 through a heated flow line 162 by means of a high pressure pump (not shown). The heated flow line maintains the temperature of the adhesive material flowing therethrough to approximately 40° C. As shown in FIG. 8, entry valve 114 is open, and discharge valve 120 is closed. Consequently, the adhesive material flows through the entry valve 114, past a T junction 164, and through flow line 166 into the adhesive load cylinder 116. The adhesive load cylinder 116 is surrounded by a heating jacket, and is also provided with a solvent reservoir tank 168 which contains solvent used to maintain the walls of the cylinder 116 clear from adhesive material during shut down periods of the apparatus. The adhesive load cylinder 116 has a piston 170 which is directly mechanically linked with a corresponding piston 172 in the hydraulic cylinder 122 by means of a connecting rod 174. The to and fro movement of the connecting rod 174 is monitored by a switch sensor 176 coupled to a warning light (not shown), said warning light serving as a means of warning the operator that the adhesive load cylinder 116 is refilled with adhesive material. The hydraulic circuit connecting the hydraulic power pack 124 to the hydraulic cylinder 122 is shown in FIG. 8, and is designed to provide a regulated hydraulic pressure to ensure a predetermined rate of movement of the piston 172 to and fro within the hydraulic cylinder 122. The components utilised in this hydraulic circuit are all standard components utilised in a standard configuration to produce such a regulated hydraulic pressure in the circuit, and thus need not be described in detail any further.

Entry valve 114 and discharge valve 120 are both solenoid actuated pneumatic control valves, the operation of which is under the direct control of the computer numerical control system 18, the compressed air to operate these two valves being supplied through pressure lines 178 and 180, which pressure lines are connected to a solenoid actuated valve 182 on a compressed air line. Compressed air is supplied to this compressed air line from a source 184, and passes through inlet valve 186, a combined filter and automatic drain assembly 188, and then through a pressure regulator 190, which regulates the air pressure down to a pressure of 6 bar. This pressure regulated air then passes through a lubricator 192 and a further solenoid-operated valve 194 equipped with a silencer 196. The supply of compressed air leaving the solenoid-operated valve 194 is split into two flows, one of which is supplied to the solenoid-operated valve 182. The other flow of compressed air passes along pressure line 198 and is divided again into two portions, one portion passing along pressure line 200 to a solenoid-actuated valve 202 which is connected to two pneumatically actuated latching devices 204 and 206. Latching devices 204 and 206 are located on the support structure 94 beneath the dispensing means 14, and serve to latch the support carriages 96 and 98 accurately into position beneath the dispensing means 14 before the application of the strip of adhesive material takes place. As shown in FIG. 8, these two latching devices 204, 206 are shown in the unlatched position indicated by the letters UU'. The solenoid-operated valve 202 is actuated automatically when a respective support carriage is in the correct position beneath dispensing means 14, and causes the latching devices 204, 206 to move from the unlatched position to a latched position indicated by the letters LL'.

The remaining portion of the compressed air supply passes into a second pressure regulator 208 where it is reduced to a line pressure of 2 bar. This line pressure is then supplied to two solenoid-operated valves 210 and 212, solenoid-operated valve 210 serving to actuate the rodless cylinder 110, and the solenoid-operated valve 212 serving to actuate the rodless cylinder 112. As shown in FIG. 8, both of the rodless cylinders 110 and 112 are in the position corresponding to the respective support carriages 96 and 98 being in the load position, indicated in FIG. 8 by the letters OO'. Movement of the support carriage 96, for example, into position under the dispensing means 14 is produced by the actuation of solenoid-operated valve 210 to cause the rodless cylinder 110 to shuttle the support carriage 96 from the load position to the position under the dispensing means 14, indicated on FIG. 8 by the letter I. Similarly, the actuation of the solenoid-operated valve 212 will cause the rodless cylinder 112 to shuttle the support carriage 98 into position under the dispensing means 14, this position being shown in FIG. 8 by the letter I'. The operation of both solenoid-operated valve 210 and solenoid-operated valve 212 can be under the control of the operator, or, if desired, entirely under the control of the computer numerical control system 18.

An adhesive application apparatus according to the present invention provides a means of rapidly and accurately placing a strip of adhesive material around either the periphery of a window opening in a motor vehicle or the periphery of a pane of window glass sized to fit that opening, with just the right quantity of adhesive material used to ensure a secure weather tight joint between the glass and the body work of the motor vehicle. Consequently, the use of such apparatus affords a means of obtaining substantial economy in the use of the very expensive adhesive material used for this purpose. Moreover, in a preferred form of the present invention, it is possible to operate the apparatus under substantially full computer numerical control, including dealing with a mixture of motor vehicle body types on the production line and a mixture of different shapes of window glass, with a minimum of operator involvement.

What we claim is:

1. An adhesive application apparatus for applying a continuous strip of extrudable adhesive material to the periphery of either a window opening in a motor vehicle or a pane of glass sized to cover said window opening, said apparatus comprising a pressurized supply means connected to a source of said adhesive, the pressurized supply means including a reservoir which contains at least sufficient of said extrudable adhesive material for applying around the entire periphery of said window opening or pane of glass, which reservoir is emptied at a predefined rate during application of said adhesive material to said periphery, and is automatically refilled with adhesive material from a bulk reservoir when said application is not occurring; a dispensing means including an angularly movable nozzle having a tip alignable with said periphery and having a truncated conical-shaped opening across the tip thereof through which the adhesive material is extruded in a strip of predetermined cross-sectional shape upon movement of the nozzle along said periphery with the truncated conical-shaped opening moving parallel to said periphery, said nozzle being movably mounted within a stationary rigid framework surrounding said periphery, said dispensing means being in fluid connection with said pressurized supply means and being movable relative to said rigid framework by drive means, said drive means including three separate drive motors for controlling the movement of said dispensing means relative to said rigid framework in three dimensions all mutually at right angles to one another, each drive motor controlling said movement in one linear dimension, and a fourth drive motor controlling angular movement of said nozzle with respect to said periphery as the nozzle moved around each corner of said window opening or said pane of glass; and a computer numerical control system connected to both the pressurized supply means and said drive means, said computer numerical control system being operable by a predetermined program to exert full automatic control over the pressurized supply means and the drive means so that, when the apparatus is in operation, a predefined quantity of said strip of adhesive material is extruded at said predefined rate from said nozzle on to said periphery, the nozzle of the dispensing means is caused to accurately follow said periphery, and all four of said drive motors are under full positional and speed control exerted by said computer numerical control system with said fourth drive motor particularly controlling angular movement of the nozzle to assure the extrusion of a strip or adhesive material of predetermined cross-sectional area along the periphery and around the corners by maintaining a parallel orientation of said truncated conical-shaped opening with said periphery.

2. An adhesive application apparatus, according to claim 1, for applying a continuous strip of extrudable adhesive material to the periphery of a window opening in a motor vehicle, in which the rigid framework is movably mounted within a support structure in such a manner that the rigid framework can be quickly located on said motor vehicle relative to said periphery and clamped into a stationary position on said motor vehicle prior to commencement of the extrusion of said strip of adhesive material from said nozzle, and the apparatus includes sensor means connected to said computer numerical control system and operable to prevent extrusion of the adhesive material until the rigid framework is both located relative to said periphery and clamped into position on said motor vehicle.

3. An adhesive application apparatus, according to claim 1, for applying a continuous strip of extrudable adhesive material to the periphery of a pane of glass sized to cover a window opening in a motor vehicle in which the rigid framework is mounted within a support frame which includes at least one support carriage for said pane of glass, which support carriage is movably mounted on said support frame so that said pane of glass can be rapidly and accurately located relative to said rigid framework prior to commencement of the extrusion of said strip of adhesive material from said nozzle, and the support carriage includes sensor means linked to said computer numerical control system and operable to prevent extrusion of adhesive material until said pane of glass is rapidly and accurately located with said rigid framework.

4. An adhesive application apparatus, according to claim 3, in which said support carriage includes a glass-carrying fixture which pre-aligns the pane of glass on said support carriage relative to said rigid framework prior to the movement of said support carriage into location with said rigid framework.

5. An adhesive application apparatus, according to claim 4, in which said glass-carrying fixture includes a sensor means connected to said computer numerical control system, which sensor means is operable to detect the presence of a pane of glass in said glass-carrying fixture and to prevent extrusion of adhesive material until said pane of glass is present in said glass-carrying fixture.

6. An adhesive application apparatus, according to claim 5, in which said computer numerical control system contains a number of predetermined programs, each of which relate to a pane of glass having a predefined shape, said glass-carrying fixture is shaped to pre-align a pane of glass selected from panes of glass having the pre-defined shapes corresponding to the predetermined programs in the computer numerical control system, and the fixture includes further sensors corrected to said computer numerical control system, which sensors are operable to detect which pre-defined shape of glass pane is present in the fixture and to generate signals which are fed to the computer numerical control system to enable said system to select the correct predetermined program to accurately control the movement of the nozzle of the dispensing means around the periphery of said glass pane.

* * * * *